United States Patent
Boxwell et al.

(10) Patent No.: US 10,440,325 B1
(45) Date of Patent: Oct. 8, 2019

(54) CONTEXT-BASED NATURAL LANGUAGE PARTICIPANT MODELING FOR VIDEOCONFERENCE FOCUS CLASSIFICATION

(71) Applicant: International Business Machines Corporation, Armonk, NY (US)

(72) Inventors: Stephen A. Boxwell, Columbus, OH (US); Keith G. Frost, Delaware, OH (US); Stanley J. Vernier, Grove City, OH (US); Kyle M. Brake, Dublin, OH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/037,723

(22) Filed: Jul. 17, 2018

(51) Int. Cl.
*H04N 7/15* (2006.01)
*H04N 5/60* (2006.01)
*G10L 15/08* (2006.01)
*H04N 5/445* (2011.01)
*H04N 7/14* (2006.01)

(52) U.S. Cl.
CPC .............. *H04N 7/15* (2013.01); *G10L 15/08* (2013.01); *H04N 5/445* (2013.01); *H04N 5/60* (2013.01); *H04N 7/147* (2013.01)

(58) Field of Classification Search
CPC ............ H04N 7/15; H04N 5/445; H04N 5/60; H04N 7/147; G10L 15/08
See application file for complete search history.

(56) References Cited

U.S. PATENT DOCUMENTS

| 5,953,050 A | 9/1999 | Kamata et al. |
| 6,185,531 B1 | 2/2001 | Schwartz et al. |
| 6,473,114 B1 | 10/2002 | Strubbe |

(Continued)

FOREIGN PATENT DOCUMENTS

EP 2698747 A1 2/2014

OTHER PUBLICATIONS

Rehab M. Duwairi, and Mosab Alfaqeeh, "RUM Extractor: A Facebook Extractor for Data Analysis," 2015 3rd International Conference on Future Internet of Things and Cloud, Year: 2015, pp. 709-713.

(Continued)

*Primary Examiner* — Stella L. Woo
(74) *Attorney, Agent, or Firm* — Pepper Hamilton LLP

(57) ABSTRACT

A video conferencing system includes a processing device and a memory device and is configured to manage a video conference to manage a video conference feed to a plurality of participant devices. The system includes an interface control module that receives a plurality of video feeds and audio feeds associated with participants to the video conference, and generates a video conference feed including a video conference interface for being displayed to the plurality of participants. The system also includes a context analysis module that analyzes the audio feeds to identify contextual information associated with the conversation. The system further includes a participant modeling module that calculates a topic relevance score for each of the plurality of participants based on the contextual information. During a video conference, the interface control module emphasizes a video feed of a participant associated with a topic relevance score greater than a threshold.

18 Claims, 7 Drawing Sheets

(56) References Cited

U.S. PATENT DOCUMENTS

| | | | |
|---|---|---|---|
| 2005/0099492 A1* | 5/2005 | Orr .................... | H04L 12/1827 |
| | | | 348/14.08 |
| 2010/0188475 A1* | 7/2010 | Le Goff ............. | G10L 15/1822 |
| | | | 348/14.08 |
| 2013/0169742 A1* | 7/2013 | Wu ....................... | H04N 7/147 |
| | | | 348/14.08 |
| 2016/0124958 A1 | 5/2016 | Sinha et al. | |
| 2016/0156876 A1* | 6/2016 | Breedvelt-Schouten .................... | |
| | | | H04N 7/15 |
| | | | 348/14.08 |
| 2016/0191577 A1* | 6/2016 | Inagaki .............. | H04L 67/1097 |
| | | | 709/204 |
| 2016/0261828 A1* | 9/2016 | Ge ..................... | G06K 9/00221 |
| 2016/0286049 A1 | 9/2016 | Guo et al. | |
| 2018/0176508 A1* | 6/2018 | Pell ....................... | H04N 7/147 |

OTHER PUBLICATIONS

Norngainy Mohd Tawil, Alissyazmim Abd Halim, Shamshubaridah Ramlee, and Norhana Arsad, "Enhancing small medium enterprises opportunity through online portal system," 2016 International Conference on Advances in Electrical, Electronic and Systems Engineering (ICAEES), Year: 2016, pp. 631-635.

\* cited by examiner

CONTEXT-BASED NATURAL LANGUAGE PARTICIPANT MODELING FOR VIDEOCONFERENCE FOCUS CLASSIFICATION

TECHNICAL FIELD

The present application relates generally to participant modeling and, more particularly, to context-based natural language participant modeling for videoconference focus classification.

BACKGROUND

In a multi-person video conference setting, a video conferencing system will implement a process to focus the presentation on a particular individual, usually the person speaking at the time. For example, the conferencing system will detect a participant that is speaking and place the video feed associated in view for the other participants or give that participant's video feed a larger or more prominent space on the screen. Other participants (e.g., those not speaking or participating at the time) may be given a smaller portion of the screen for their respective video feeds, or not be shown at all.

The current approach of many video conferencing systems to focus only on a designated presenter or person speaking at the time is too basic and does not take into account that certain situations may benefit from other participants being emphasized or receiving a focus from the system. For example, a topic of conversation may relate to the expertise of a particular participant such that providing a focus on that person for others to view would be beneficial to the group. In a normal group conversation setting, where everyone is in the same room, people can generally look to certain people, whether they are speaking or not, for reactions and input during certain situations based on context. The present disclosure is directed to enhancing video conferencing systems in order to consider contextual information in determining how to present the video conference feed to participants in order to provide an experience which more closely resembles that of a face-to-face conference.

SUMMARY

In some embodiment, a computer-implemented method for managing a video conference includes receiving, at an interface control module, a plurality of video feeds and audio feeds associated with a plurality of participants engaged in a conversation via the video conference, and generating, by the interface control module, a video conference feed based on the plurality of video feeds and audio feeds, the video conference feed including a video conference interface for being displayed to the plurality of participants. The method further includes analyzing, by a context analysis module, the audio feeds to identify contextual information associated with the conversation, and calculating, by a participant modeling module, a topic relevance score for each of the plurality of participants based on the contextual information. The method also includes emphasizing, by the interface control module, a video feed of a participant associated with a topic relevance score greater than a threshold within the video conference interface.

In other embodiments, a video conferencing system includes a processing device configured to manage a video conference by executing software stored on a memory device to receive a plurality of video feeds and audio feeds associated with a plurality of participants engaged in a conversation via the video conference, and generate a video conference feed based on the plurality of video feeds and audio feeds, the video conference feed including a video conference interface for being displayed to the plurality of participants. The video conferencing system is further configured to execute instructions to analyze the audio feeds to identify contextual information associated with the conversation, and calculate a topic relevance score for each of the plurality of participants based on the contextual information. The video conferencing system is further configured to emphasize a video feed of a participant associated with a topic relevance score greater than a threshold within the video conference interface.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Figure 1:
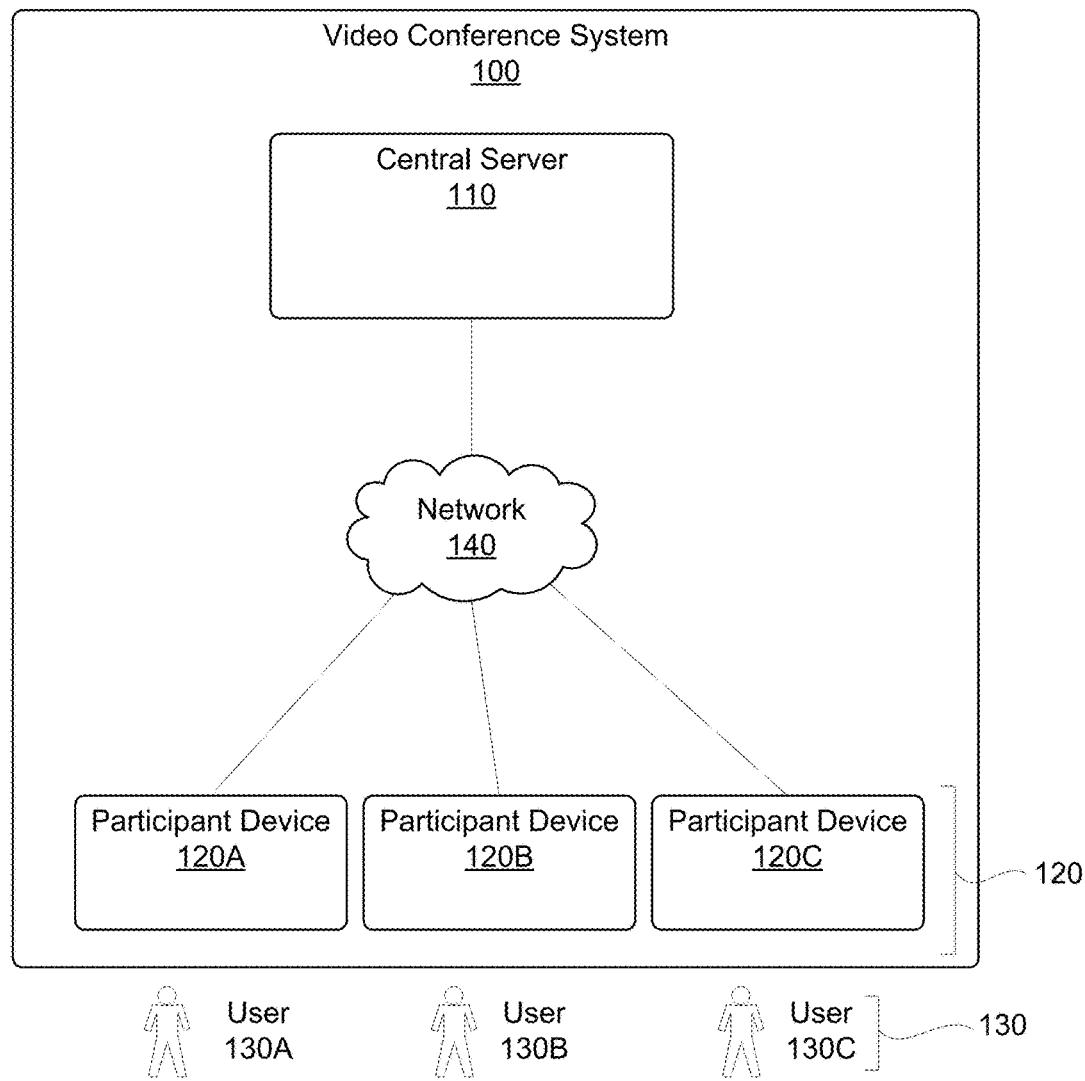
FIG. 1 depicts a schematic diagram of one illustrative embodiment of a video conference system, consistent with disclosed embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implementing the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

Embodiments of the present invention include a video conferencing system configured to perform context-based natural language participant modeling for videoconference focus classification. The video conferencing system includes a central or lead device, such as a server, which receives a plurality of audio feeds and video feeds associated with participants at participant devices. The audio feeds are controlled to provide a return audio feed to each participant device. The plurality of video feeds are arranged for presentation within a video conference interface which is transmitted to each of the participant devices for being displayed to the participants. The central device is configured to modify the video conference interface throughout the video conference, including emphasizing and arranging certain video feeds based on a context associated with the video conference.

In some embodiments, the central device is configured to perform speech recognition of audio data being received as part of the video feeds and feed speech recognition data into a plurality of models associated with each of the participants to the video conference. The plurality of models are trained for each participant prior to the video conference and, in at least some embodiments, are based on information which identifies or is otherwise associated with the participant. For example, the central device may define each model based on area-of-expertise and/or experience information associated with a particular participant. This information may be gathered from sources such as resumes and employee profiles.

In some embodiments, the central device is configured to calculate a topic relevance score based on contextual information gathered from the ongoing video conference and the participant models. The topic relevance score may be an indication of correlation between the skills or knowledge of a participant and the topic or content of the conversation occurring during the video conference. The participant models may be trained on various factors, with the expertise of the participant being one example.

Under conventional video conferencing schemes, the speaker or a designated leader may be the participant whose video feed is emphasized or featured in the user interface associated with the video conference. Through the participant models and analysis of the video conference conversation, it is possible for the central device to identify one or more participants which are relevant to a topic of conversation, even if that participant is not the person speaking currently. There are several reasons why it would be beneficial to identify these people, including the ability to more prominently display their video feed so that their behavior (non-verbal cues, facial expressions, etc.) can be viewed. The context-based analysis of the present disclosure can be trained on different types of context, such as topics of conversation, questions being posed, order of presenters, etc., thereby allowing the video conferencing system to adjust a user interface in a manner that more clearly mimics a face-to-face conference.

FIG. 1 depicts a schematic diagram of one illustrative embodiment of a video conferencing system 100. The video conferencing system 100 includes, for example, a central server 110 and a plurality of participant devices 120 each associated with a user 130 and which are all connected through a network 140. The central server 110 and the plurality of participant devices 120 are functionally represented as singular separate components but it should be understood that the disclosed embodiments are not so limited. Moreover, the devices may be combined in some embodiments. For example, the central server 110 and/or the components thereof may be integrated into one or more of the participant devices 120. The users 130 are individuals which are interchangeably described herein as participants to a video conference managed by the video conferencing system 100.

FIG. 1 illustrates three participant devices 120A, 120B, 120C as making up the plurality of participant devices 120 and three respective users 130A, 130B, 130C as making up the users 130. It should be understood that this representation is exemplary and that other embodiments may include more (or less) participant devices 120 and associated users 130. Moreover, it is not necessary that each participant device 120 only have one associated users 130. In some embodiments, a single user 130 may represent all participants within a single video feed, such as a video feed of a conference room with multiple people.

The central server 110 may be implemented in hardware and/or software and may include various constituent components. These components may include, for example, one or more processing devices, one or more memory devices, and/or one or more databases. The central server 110 is particularly configured as an information hub which is configured to receive data from the participant devices 120 and transmit data to the participant devices 120. For example, the central server 110 may be configured as a processing server which receives video feed data from each of the participant devices 120 and transmits a video conference interface to the participant devices 120 for displaying to the users 130. In an embodiment, the central server 110 is a server, but is not limited to such an embodiment.

The participant devices 120 are preferably computing devices configured to be terminals for joining a video conference managed by the video conferencing system 100. The participant devices 120 may be, for example, personal computers (e.g., laptops, desktops, etc.), tablets, smart phones, etc. The participant devices 120 may include constituent components. These components may include, for example, audio visual capture devices which are configured to collect data associated with a video feed, communication hardware for sending and receiving data to and from other components of the video conferencing system 100, and a display device for displaying information to the user 130, such as a display screen configured to display a user interface.

The users 130 may be individuals which are associated with a respective participant device. For example, the users 130 may be employees of one or more companies which are participating in a video conference via the video conference system 100. The users 130 are different people with different personal characteristics. The users 130 may be employees in different companies, departments, have different professions and/or expertise. The users 130 may have different roles within the video conference, such as leader, listener, viewer, etc., all of which may be considered a "participant" role as used herein. In other words, a user 130 is a participant in a video conference when that individual is viewing a user interface associated with the video conference and/or that individual appears in a video feed which is provided to the central server 110 as part of the video conference.

The network 140 may be a local or global network and may include wired and/or wireless components and functionality which enable communication between the central server 110 and the participant devices 120. The network 140 may be embodied by the Internet, provided at least in part via cloud services, and/or may include one or more communication devices or systems which enable data transfer to and from the systems and components of the central server 110 and participant devices 120.

In accordance with some exemplary embodiments, the elements of video conferencing system 100 include logic implemented in specialized hardware, software executed on hardware, or any combination of specialized hardware and software executed on hardware, for implementing the video conferencing system 100. In some exemplary embodiments, the video conferencing system 100 may be or include the IBM Watson™ system available from International Business Machines Corporation of Armonk, N.Y., which is augmented with the mechanisms of the illustrative embodiments described hereafter.

Figure 2:
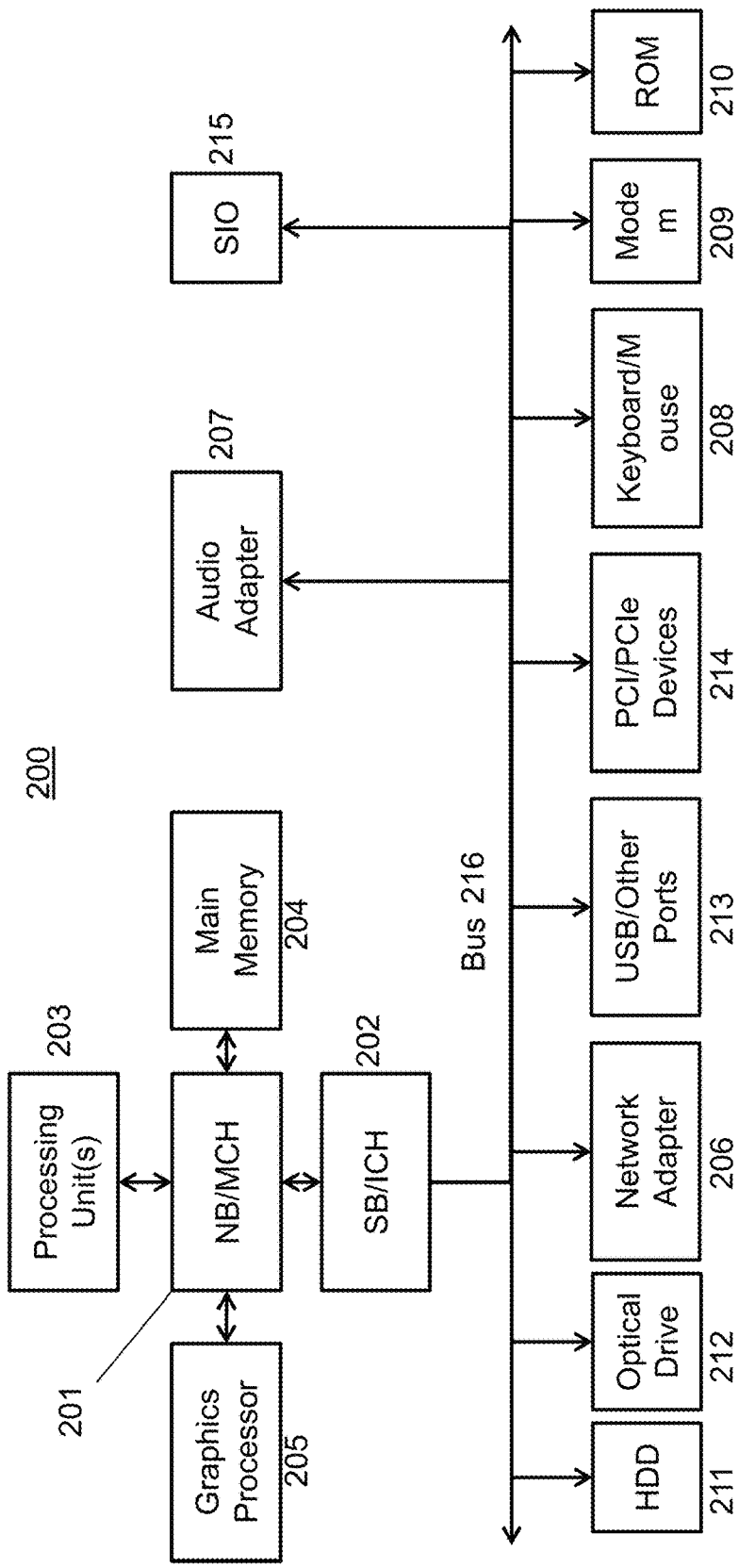
FIG. 2 depicts a block diagram of an example data processing system in which aspects of the illustrative embodiments may be implemented, consistent with disclosed embodiments.

FIG. 2 is a block diagram of an example data processing system 200 in which aspects of the illustrative embodiments are implemented. Data processing system 200 is an example of a computer, such as a server or client, in which computer usable code or instructions implementing the process for illustrative embodiments of the present invention are located. In one embodiment, FIG. 2 represents a server computing device, such as the central server 110, which implements the video conferencing system 100 described herein.

In the depicted example, data processing system 200 can employ a hub architecture including a north bridge and memory controller hub (NB/MCH) 201 and south bridge and input/output (I/O) controller hub (SB/ICH) 202. Processing unit 203, main memory 204, and graphics processor 205 can be connected to the NB/MCH 201. Graphics processor 205 can be connected to the NB/MCH 201 through an accelerated graphics port (AGP).

In the depicted example, the network adapter 206 connects to the SB/ICH 202. The audio adapter 207, keyboard and mouse adapter 208, modem 209, read only memory (ROM) 210, hard disk drive (HDD) 211, optical drive (CD or DVD) 212, universal serial bus (USB) ports and other communication ports 213, and the PCI/PCIe devices 214 can connect to the SB/ICH 202 through bus system 216. PCI/PCIe devices 214 may include Ethernet adapters, add-in cards, and PC cards for notebook computers. ROM 210 may be, for example, a flash basic input/output system (BIOS). The HDD 211 and optical drive 212 can use an integrated drive electronics (IDE) or serial advanced technology attachment (SATA) interface. The super I/O (SIO) device 215 can be connected to the SB/ICH 202.

An operating system can run on processing unit 203. The operating system can coordinate and provide control of various components within the data processing system 200. As a client, the operating system can be a commercially available operating system. An object-oriented programming system, such as the Java™ programming system, may run in conjunction with the operating system and provide calls to the operating system from the object-oriented programs or applications executing on the data processing system 200. As a server, the data processing system 200 can be an IBM® eServer™ System p® running the Advanced Interactive Executive operating system or the Linux operating system. The data processing system 200 can be a symmetric multiprocessor (SMP) system that can include a plurality of processors in the processing unit 203. Alternatively, a single processor system may be employed.

Instructions for the operating system, the object-oriented programming system, and applications or programs are located on storage devices, such as the HDD 211, and are loaded into the main memory 204 for execution by the processing unit 203. The processes for embodiments of the video conferencing system 100 can be performed by the processing unit 203 using computer usable program code, which can be located in a memory such as, for example, main memory 204, ROM 210, or in one or more peripheral devices.

A bus system 216 can be comprised of one or more busses. The bus system 216 can be implemented using any type of communication fabric or architecture that can provide for a transfer of data between different components or devices attached to the fabric or architecture. A communication unit such as the modem 209 or network adapter 206 can include one or more devices that can be used to transmit and receive data.

Those of ordinary skill in the art will appreciate that the hardware depicted in FIG. 2 may vary depending on the implementation. Other internal hardware or peripheral devices, such as flash memory, equivalent non-volatile memory, or optical disk drives may be used in addition to or in place of the hardware depicted. Moreover, the data processing system 200 can take the form of any of a number of different data processing systems, including but not limited to, client computing devices, server computing devices, tablet computers, laptop computers, telephone or other communication devices, personal digital assistants, and the like. Essentially, data processing system 200 can be any known or later developed data processing system without architectural limitation.

Figure 3:
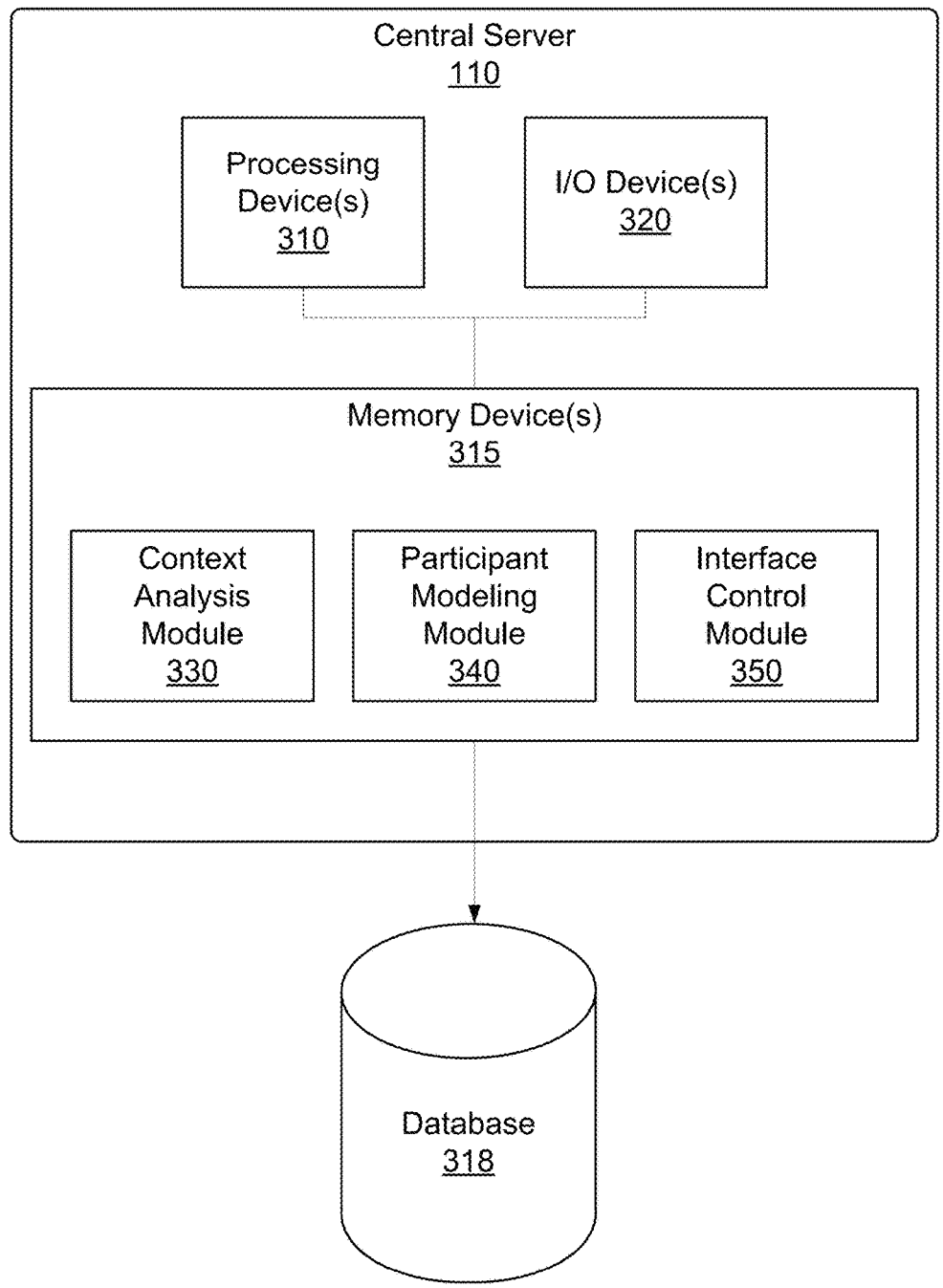
FIG. 3 depicts a schematic diagram of an exemplary embodiment of a central server, consistent with disclosed embodiments.

FIG. 3 is a schematic illustration of an exemplary embodiment of the central server 110. The central server 110 preferably includes one or more processing devices 310, one or more memory devices 315, one or more databases 318, and one or more input/output (I/O) devices 320. The one or more processing devices 310 are configured to execute software instructions stored in the one or more memory devices 315 to perform one or more processes associated with the video conferencing system 100. The database(s) 318 may store information such as user profile information having identifying characteristics associated with users 130, a corpus of documents such as resumes, employee profiles, authored works, etc., which relate to users 130, and/or participant models which are trained on one or more of the users 130, as will be described in more detail herein. The I/O devices 320 may include data terminals which control the receipt and transmission of data to and from the central server 110. In some embodiments, the I/O devices 320 may include a display device configured to present information, such as a video conference interface.

In an exemplary embodiment, the central server further comprises one or more modules 330-350 that are implemented in hardware and/or software and which enable the central server 110 to perform one or more processes associated with the video conferencing system 100. In some embodiments, the modules 330-350 are software modules stored in the one or more memory devices 315, but are not limited thereto.

In the illustrated embodiment, the modules 330-350 include an context analysis module 330, a participant modeling module 340, and an interface control module 350. The context analysis module 330 may be configured to analyze an audio feed associated with a video conference and identify contextual information from the audio feed. The context analysis module 330 may be configured to perform voice or language recognition (e.g., speech-to-text processing) in order to generate a continuous data stream representative of a conversation which is occurring during the video conference. The data stream may be, in one example, a grouping and/or ranking of words which are identified from the audio feed. The grouping and/or ranking of words is one example of contextual information which is drawn from audio feeds of a conversation taking place via video conference. In another example, the context analysis module 330 may identify contextual information from other sources, including, for example textual data associated with the video conference (e.g., a slide or page of a presentation), or visual data from one or more of the video feeds.

The participant modeling module 340 may be configured to identify the users 130 as participants to a video conference and generate or receive a participant model associated with the users 130. The participant modeling module 340 may train each model on identifying information associated with each user 130. For example, prior to or during the video conference, the participant modeling module 340 may create a participant model for each user 130 based on documents or other sources which have identifying characteristics that describe each respective user. These sources may include, for example, resumes or employee profiles that identify professional expertise associated with each user. The participant modeling module 340 may identify particular words or phrases which describe the user 130 (e.g., words associated with a particular profession, degree, background, qualifications, experience, education, etc.).

The interface control module 350 may be configured to generate a video conference interface and transmit the video conference interface to the participant devices 120 for displaying to the users 130. The interface control module 350 may receive an audio feed and/or a video feed associated with each of the participant devices 120 which are connected to a video conference. The interface control module 350 may be configured to index and/or mark the various feeds and use the feeds to produce dynamic video conference feed which is transmitted back to the participant devices 120. The interface control module 350 generates the video conference interface and selectively controls which video feeds are presented, their positioning, and any emphasis/features that may be used in the presentation of the video conference interface.

The modules 330-350 are configured to operate in conjunction with each other to administer the video conferencing processes described herein. For example, the context analysis module 330 is configured to supply contextual information identified from an audio feed of a conversation to the participant modeling module 340. The participant modeling module 340 is configured to compare the contextual information to one or more participant models which are trained on the users 130 that are participants to a video conference from which the contextual information was identified. The participant modeling module 340 may be configured to evaluate the contextual information's relationship to the participant models. For example, the participant modeling module 340 may calculate a topic relevance score associated with each participant based on contextual information received from the context analysis module 330. The topic relevance score, in one embodiment, may be a numerical representation of a correlation between the contextual information and identifying characteristics of each participant. For instance, if an audio feed includes multiple words that match or correlate to words in a particular participant model, the participant modeling module 340 may generate a larger topic relevance score than in a situation in which fewer words are matched or correlated. While a topic relevance score is described herein as a numerical score, it is not so limited. In some embodiments, the topic relevance score may be a rating or range which indicates a correlation between contextual information and identifying information.

The interface control module 350 is configured to generate a video conference interface which is transmitted to the participant devices for being displayed to the users 130. The video conference interface may include, for example, designated areas for presenting a video feed associated with one or more of the participants. The interface control module 350 may be configured to emphasize certain video feeds. For example, the interface control module 350 may determine which of a plurality of video feeds to place in a designated portion of the video conference interface. In a conventional video conferencing system, a video feed associated with a person who is speaking at the time (e.g., an active audio feed) may be placed in a designated location for all participants to easily view the user while they are speaking. The interface control module 350 of the present disclosure is configured to consider additional information, such as topic relevance scores, to determine how and when to present video feeds within the video conference interface. For example, the interface control module 350 may emphasize a particular video feed based on the user associated with that video feed being an expert in a field which is currently a topic of conversation during the video conference.

Figure 4:
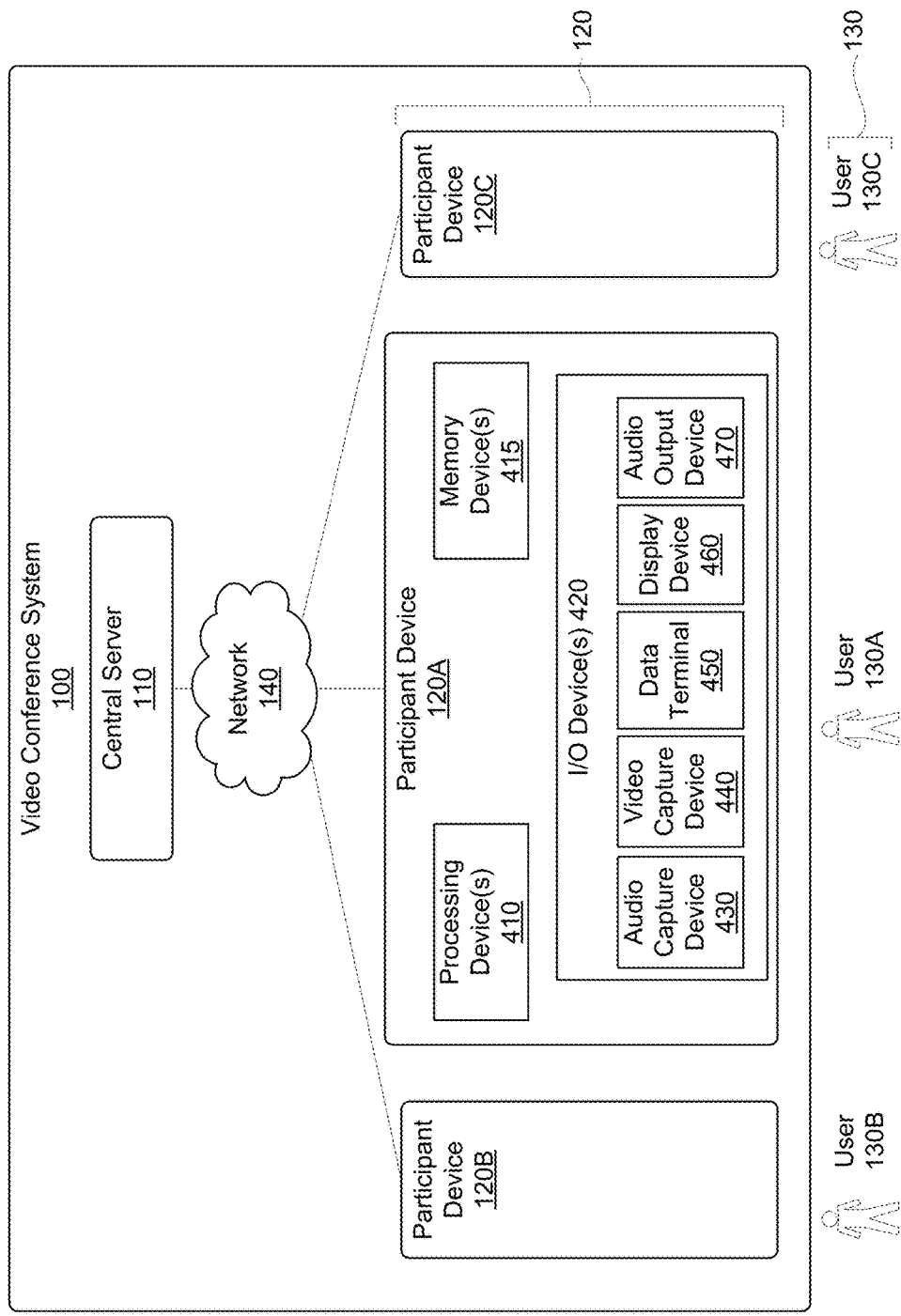
FIG. 4 depicts another schematic diagram of another illustrative embodiment of the video conference system consistent with disclosed embodiments.

FIG. 4 is a schematic illustration of the video conferencing system 100, including additional detail of a selected participant device 120A. The participant device 120A is associated with a user 130A. Participant devices 120B and 120C, as well as any additional participant devices, may be configured similarly to participant device 120A. The participant device 120A, which may be a computing device such as a laptop, desktop, tablet, smart phone, or the like, includes one or more processing devices 410, one or more memory devices 415, and one or more input/output (I/O) devices 420. The memory devices 415 may store, for example, an operating system, control program, mobile application, or other software configured to join the participant device 120A to a video conference.

The participant device 120A further includes (e.g., as I/O devices 420) an audio capture device 430, a video capture device 440, a data terminal 450, a display device 460, and an audio output device 470. The audio capture device 430 may be a microphone, the video capture device 440 may be a camera, the data terminal 450 may be a data port connected to the network 140, the display device 460 may be a monitor and/or touch screen device, and the audio output device 470 may be a speaker.

The processing devices 410 may be configured to execute software instructions in order to perform one or more processes associated with the video conferencing system 100. For example, the processing devices 410 may collect an audio feed from the audio capture device 430 and a video feed from the video capture device 440. The processing devices 410 may further send and receive data to and from the central server via the data terminal 450. For example, the processing devices 410 may transmit the audio feed and the video feed to the central server 110 and receive a video conference feed back from the central server 110. The video conference feed may include an output audio feed and a video conference interface. The display device 460 is configured to display information to the user 130A and the audio output device 470 is configured to play audio to the user 130A. For example, the display device 460 is configured to display the video conference interface to the user 130A and the audio output device 470 is configured to play an output audio feed to the user 130A.

The central server 110 is configured to simultaneously receive audio and video feeds from each participant device 120 and return the video conference feed to each participant device 120 in the same or a similar manner to participant device 120A. In this way, each participant device 120 (including participant device 120A) is configured to participate in a video conference according to disclosed embodiments.

The user 130A may control the participant device 120A to initiate or join a video conference which is managed or administered by the central server 110. In doing so, the participant device 120A is configured to provide information identifying the user 130A to the central server 110. For example, the participant device 120A may transmit login information to the central server 110 in order for the participant device 120A to join the video conference. The login information may identify the user 130A to the central server 110 such that the participant modeling module 340 may identify and/or create a participant model associated with the user 130A. The central server 110 may be configured to repeat this process for each of the participant devices 120 such that the participant modeling module 340 obtains a participant model for each of the users 130 which participate in the video conference.

Figure 5:
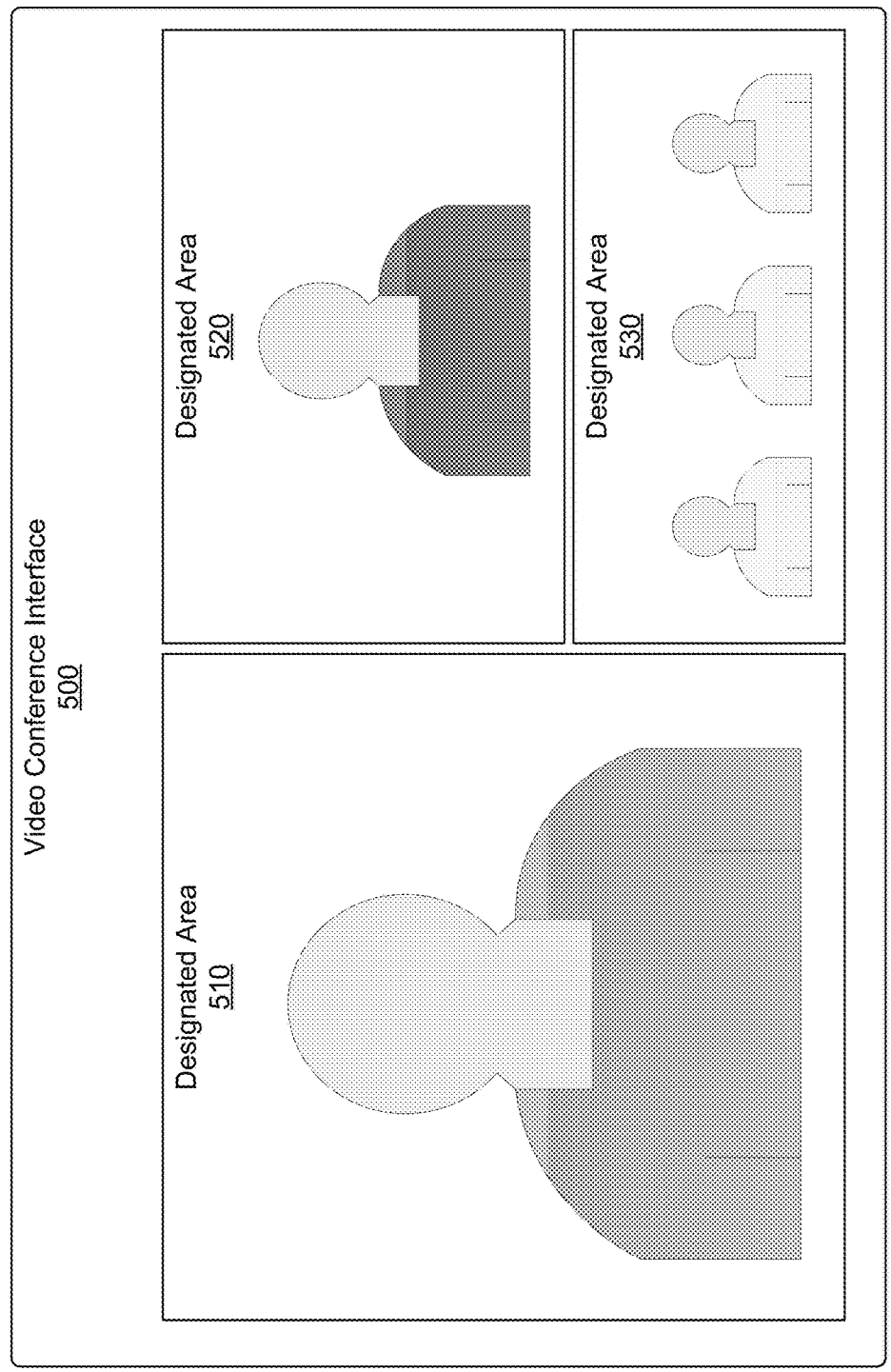
FIG. 5 depicts an exemplary video conference interface, consistent with disclosed embodiments.

FIG. 5 is an example of a video conference interface 500 which may be displayed by a display device 460 of a participant device 120. The video conference interface 500 includes a first designated area 510 for displaying a video feed of the plurality of video feeds, a second designated area 520 for displaying another video feed of the plurality of video feeds, and a third designated area 530 for displaying additional information. In other embodiments, the video conference interface 500 may include more or less designated areas. Further, it should be understood that the arrangement depicted in FIG. 5 is exemplary and that other configurations are possible for displaying video feeds in the video conference.

In one embodiment, the interface control module 350 is configured to customize a video conference stream which includes the video conference interface 500. The video conference interface 500 is thus dynamic with the information presented in each of the designated areas 510-530 being customizable as the video conference carries on. The interface control module 350 is configured to select a video stream from a plurality of video streams received during the video conference to be presented in one or more of the designated areas 510-530. In one embodiment, the interface control module 350 selects a video feed associated with a leader or a current speaker (e.g., based on audio feed activity) and places that video feed in the designated area 510. The interface control module 350 is further configured to select a video feed from the plurality of feeds based on contextual information and place that video feed in the second designated area 520. For example, the interface control module 350 may select a video feed based on an analysis by the participant modeling module 340 (e.g., a video feed associated with a topic relevance score which exceeds a threshold).

The interface control module 350 is further configured to identify supplemental information to present in the third designated area 530. In one example, this may include a smaller presentation of one or more video feeds, such as a video feeds which are not selected either based on it being a leader/speaker or a contextual analysis. In other words, the third designated area 530 may display non-relevant or listener video feeds.

It should be understood that while the designated areas 510-530 are described as being areas for displaying video feeds, it should be understood that these (or other non-shown) areas may be used to display other information. For instance, the interface control module 350 may identify textual, graphical, or pictorial information which is placed in one of the designated areas 510-530. In one example, the interface control module 350 provides information which identifies a user 130 whose video feed has been placed in the second designated area 520 due to a contextual analysis performed by the participant modeling module 340. In this way, when a user 130 (who may or may not be speaking) is selected to be emphasized in the video conference interface 500, information (such as name, title, area of expertise) may be added to the interface to provide additional useful information for the participants to digest. In other words, the third designated area 530 (or other portion of the video conference interface 500) may be used to explain why a certain video feed is being displayed even though the user 130 is not speaking.

Figure 6:
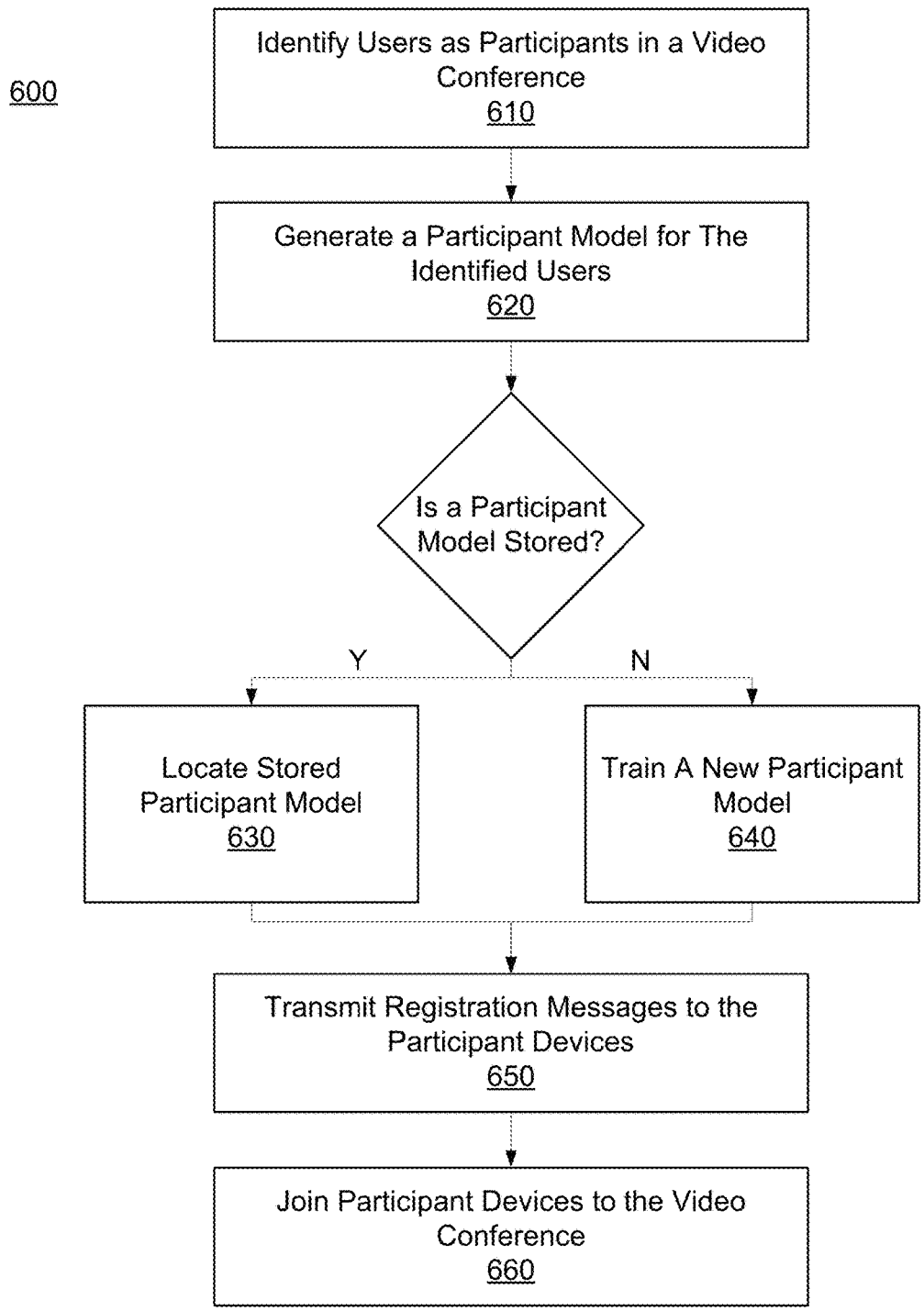
FIG. 6 depicts a flowchart of an exemplary video conferencing process, consistent with disclosed embodiments.

FIG. 6 is a flowchart of an exemplary registration process 600 for preparing the video conference system 100 for a video conference between a plurality of participant devices 120 and associated users 130. One or more components of the video conferencing system 100 may perform one or more steps of the process 600 in order to register participant devices 120 and prepare for a dynamic contextual analysis of a conversation which takes place during the video conference.

In step 610, the central server 110 identifies users 130 which are participants in a video conference. For example, the central server 110 may receive, for each participant device 120, user identifying information, such as login information, name information, registration code, passcode, etc. The participant modeling module 340 may receive the user identifying information.

In step 620, the central server 110 generates a participant model for each user 130 which is registered in step 610. The participant model may be an algorithm which correlates an input stream of data to a relevant characteristic associated with a user 130. In an exemplary embodiment, the relevant characteristic is an area of expertise of the user. The participant model may be configured to generate a topic relevance score which is a relative numerical value, rating, or range which indicates a correlation between a conversation (i.e., words spoken in an audio stream) and the relevant characteristics of the user 130. In other words, in at least some embodiments, the participant modeling module 340 is configured to generate a participant model which determines whether one or more users are highly correlated with a topic of conversation occurring during a video conference.

At step 630, the central server 110 is configured to locate an existing participant model for each user 130 associated with a registered participant device 120. For example, the participant modeling module 340 may query the database 318 to identify one or more stored participant models associated with the user 130. If no existing participant model is found, the central server may move to step 640.

At step 640, the central server 110 trains a new participant model. In order to train a new participant model, the participant modeling module 340 may review input data associated with the relevant user 130. The input data may be stored in the database 318 or another input data source, such as a corpus of documents associated with various potential users 130. The input data may include information which is indicative of a characteristic of the user 130, such as an area of expertise of the user 130. The input data may include, for example, a resume, employee profile, authored works, etc. associated with the relevant user 130. The participant modeling module 340 may utilize machine learning and/or user feedback in order to improve the training of a participant model. For example, the participant modeling module 340 may be configured to provide a survey to participants in order to gather information for the participant model.

At step 650, the central server 110 may transmit a registration message back to each participant device 120. For example, the central server 110 may inform a participant device 120 that the user 130 is successfully registered for the video conference and that a participant model has been found or created. In some instances, the central server 110 may be unable to locate or create a participant model for a particular user 130. The central server 110 may inform the participant device 120 of this finding and request information and/or simply not consider the user 130 when performing later contextual analysis processing.

At step 660, the central server 110 may join the participant device 120 to the video conference. The joined participant device 120 and the central server 110 may thereafter (e.g., for the duration of the video conference) exchange streams of data, including, for example, an audio feed and a video feed from each joined participant device 120 to the central server 110 and a video conference feed from the central server 110 to each joined participant device 120. The video conference feed include a dynamic video conference interface 500 according to disclosed embodiments.

Figure 7:
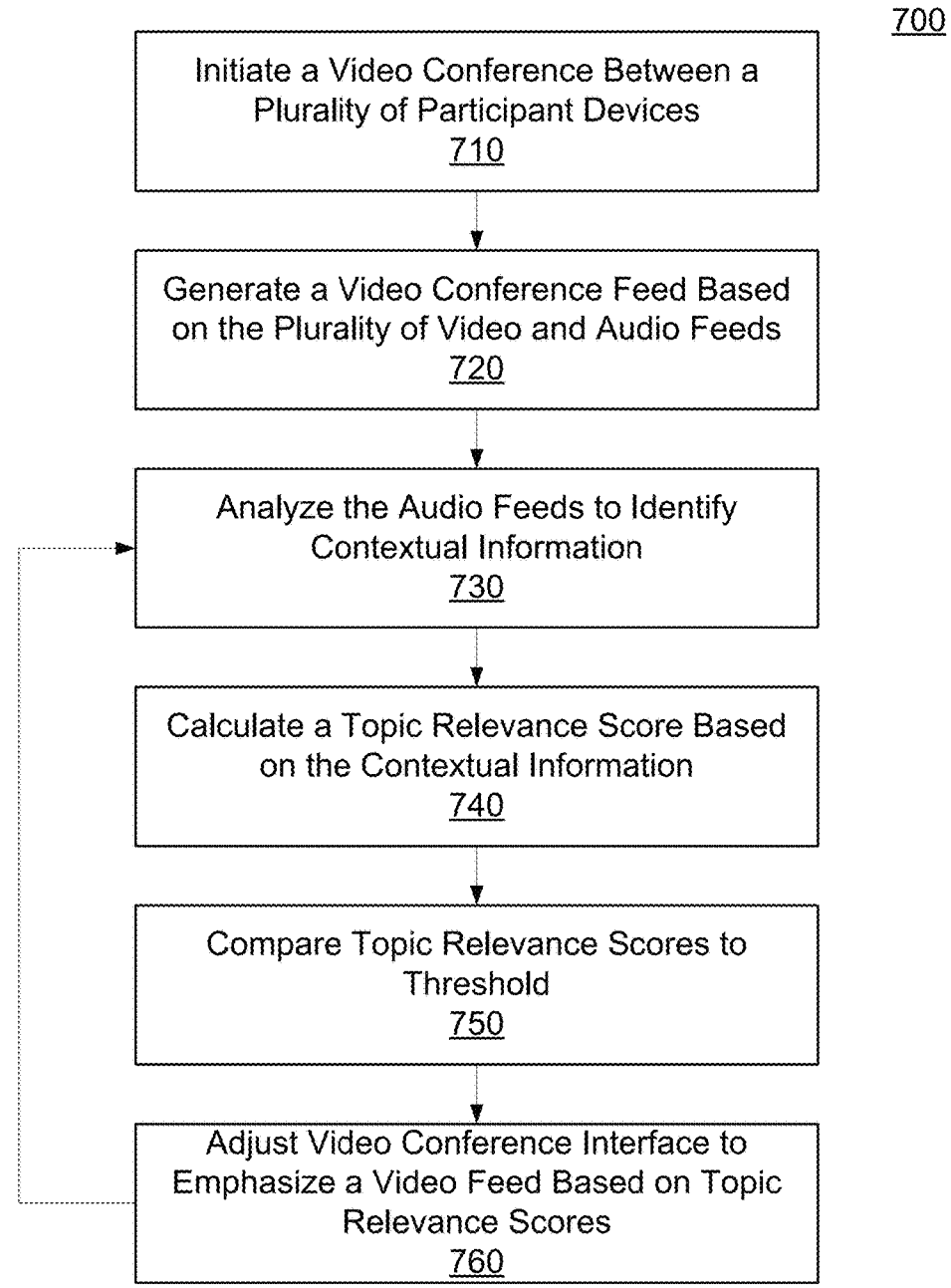
FIG. 7 depicts a flowchart of a process for emphasizing a video stream in a video conference, consistent with disclosed embodiments.

FIG. 7 is an exemplary video conference management process 700 for administering a video conference between a plurality of participant devices 120. One or more components of the video conferencing system 100 may perform one or more steps of the process 700 in order to allow a plurality of users to communicate in a virtual setting while viewing and hearing each other. In one example, the central server 110 performs one or more steps of the process 700.

In step 710, the video conferencing system 100 initiates a video conference between a plurality of participant devices 120. In some embodiments, step 710 may correspond to registration process 600. For example, the central server 110 may register participant devices 120 which are to participate in the video conference, identifying participant models for as many users 130 as possible, and starting the conference, resulting in the central server 110 receiving a plurality of video feeds and audio feeds associated with a plurality of participants engaged in a conversation via the video conference. The central server 110 receives the plurality of video feeds and audio feeds and indexes and/or marks them for ease of recall and use in subsequent steps.

In step 720, the central server 110 generates a video conference feed based on the plurality of video feeds and audio feeds. For example the interface control module 350 generates the video conference feed. The video conference feed may include a video conference interface 500 for being displayed to the plurality of users 130 via the respective participant devices 120. The video conference feed may also include an audio feed which is generated based on the received plurality of audio feeds. The output audio feed may be governed by one or more factors, including, for example, activity, volume, designation, etc. The video conference interface 500 may include one or more designated areas for customized display information, such as a selected video feed or textual, graphical, or pictorial information. For example, the interface control module 350 may be configured to produce a video conference interface 500 with various "plug-in" or dynamic areas in which content can be dynamically modified. For instance, certain live video feeds may be placed in different designated areas of the interface and adjusted as the video conference continues.

In step 730, the central server 110 analyzes the audio feeds to identify contextual information associated. In one example, the context analysis module 330 receives one or more of the audio feeds being transmitted to the central server 110 by the participant devices 120 and performs an analysis process to extract contextual information in the form of a data feed. In some embodiments, the analysis process includes a speech recognition or transcription process in which words, phrases, sentences, etc. are identified and parsed from the audio feeds and collected for the data feed.

In step 740, the central server 110 calculates a topic relevance score for each of the plurality of participants based on the contextual information. For example, the context analysis module 330 may provide the data feed of extracted contextual information to the participant modeling module 340. The participant modeling module 340 may input the data feed of contextual information into the participant models associated with the same video conference. In an exemplary embodiment, the participant modeling module 340 may produce a topic relevance score for each participant based on the participant models and the contextual information. The topic relevance score is preferably representative of a correlation between the contextual information and identifying characteristics of each participant. In effect, the topic relevance score rates how relevant each participant is with respect to a current topic or state of a conversation occurring during the video conference. As described herein, the participant model and contextual information data feed may be based on words and phrases which respectively describe a participant's expertise and a topic or state of a conversation. The topic relevance score indicates similarity between the data sets.

The data feed of contextual information is progressively fed into the participant models in order to receive a continuous stream of topic relevance scores as a conversation or presentation progresses. For example, the participant modeling module 340 may update the topic relevance score for each participant as additional contextual information is identified throughout the conversation captured in the audio feed. This participant modeling module 340, in some examples, calculates a new or updated topic relevance score after a certain period time, after a certain number of words, on a dynamic basis after each word, only when certain words are found, etc.

In step 750, the central server 110 compares topic relevance scores to a threshold value. In one example, the participant modeling module 340 identifies a topic relevance score which is greater than a threshold value which is set to indicate a sufficient correlation between the contextual information data stream and the relevant participant model. In this way, the participant modeling module may look for data spikes which indicate that a certain participant is particularly relevant at this point in time during the video conference. In another example, comparing the topic relevance scores to a threshold includes comparing the topic relevance scores of different participants to identify outliers. For example, the threshold may be a certain number or degree of statistical deviation indicating that one or more participants are likely the most relevant to the contextual information at that given point in time (even if the correlation itself is not exceedingly high).

In step 760, the central server 110 adjusts the video conference interface 500 to emphasize a video feed of a participant associated with a topic relevance score greater than a threshold. As used herein, the term emphasize is used to describe any change to the video conference interface 500 which alters the presentation of the relevant video feed. The interface control module 350 may adjust the video conference feed to emphasize the selected video feed. In one embodiment, the participant modeling module 340 finds an index or marking associated with a participant model that has exceeded a threshold and transmit a message to the interface control module 350 which includes an indication of the index or marking so that the interface control module 350 knows which video feed should be emphasized.

In one example, emphasizing the participant associated with the topic relevance score greater than the threshold includes adjusting a presentation of a video feed associated with that participant within a user interface. For example, the interface control module 350 may place the video feed in a designated portion of the video conference interface such that it may be viewed by the participants. Adjusting a presentation of a video feed may include changing from the video feed not being shown at all to the video feed being presented in any form. In another example, the video feed may be moved from one designated portion of the interface to another designated portion of the interface (e.g., a larger and/or more prominent portion of the interface). In yet another example, the interface control module 350 may highlight the video feed. This may include maintaining the video feed in the interface while adjusting a background element, such as a border or arrow which emphasizes that the video feed is relevant to the present topic of conversation.

In another example, the interface control module 350 may emphasize a video feed by adding textual information identifying the participant to the video conference interface 500. For example, the interface control module 350 may (in addition to the emphasizing steps described above or in the alternative to) add or highlight the participant's name, title, or area of expertise to a designated area of the video conference interface 500.

The interface control module 350 is configured to continuously provide the video conference feed, including video conference interface 500, to the applicable participant devices 120 such that the participant devices 120 may present the video conference interface 500 to the participants (e.g., users 130). In this way, the participants may conduct a video conference in an expected manner, with some or all video feeds being collected and quickly sent back in the form of the customized video conference interface 500 displaying one or more of the video feeds.

The disclosed systems and method allow a central server to administer the video conference in a manner which more closely represents a face-to-face conference by dynamically adjusting the video conference interface 500 to periodically emphasize certain video feeds, depending on the context of the conversation gathered from the input audio feeds. This places visual focus on individuals that are most relevant to a portion of a conversation, even if those individuals are not speaking at the time. This allows the participants to view those participant's non-verbal actions and reactions and also may cue the emphasized participant to provide a reaction or begin to speak.

In one illustrative example, a video conference may occur with 10-15 people as participants, each joining the conference from a separate participant device, such as the computer in their employee office. During the video conference, a topic of machine translation arises during the conversation. For instance, someone may state "I wonder if it would be possible to translate our product output from English to Chinese in real time." In the conference, one of the participants (e.g., participant A) is an expert in machine translation and is on the information technology team. The central server may provide a data feed which includes text of the above question and may produce a spike in a topic relevance score for the participant model associated with participant A, as that participant model was trained on documents which clearly describe participant A as knowledgeable in the field of machine translation. As a result, the central server adjusts the video conference interface to display the video feed received from participant A's participant device such that all participants can clearly see participant A and view their reaction. Moreover, participant A may be cued to respond.

In another example, suppose 20 people are meeting, and participant A is a new team member and does not know the other participant's very well. As participant B begins to speak about a certain topic that is an expertise of participant C, the central server reacts to a topic relevance score associated with participant C and emphasizes participant C's video feed. In this way, participant A is able to associated participant C with that topic. In some situations, the central server may identify participant C with textual or other information, such as by presenting participant C's name and job title, such that participant A is even more informed regarding the relevant subject.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The system and processes of the figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer-implemented method for managing a video conference, comprising:

receiving, at an interface control module, a plurality of video feeds and audio feeds associated with a plurality of participants engaged in a conversation via the video conference;

generating, by the interface control module, a video conference feed based on the plurality of video feeds and audio feeds, the video conference feed including a video conference interface for being displayed to the plurality of participants, the video conference interface comprising a first designated area, a second designated area, and a third designated area, wherein the first designated area is larger than the second designated area, and the second designated area is larger than the third designated area;

selecting, by the interface control module, a video feed associated with a current speaker based on audio feed activity and placing the selected video feed in the first designated area;

analyzing, by a context analysis module, the audio feeds to identify contextual information associated with the conversation;

calculating, by a participant modeling module, a topic relevance score for each of the plurality of participants based on the contextual information;

emphasizing, by the interface control module, a video feed of a participant associated with a topic relevance score greater than a threshold within the video conference interface; and placing, by the interface control module, additional video feeds from the plurality of video feeds in the third designated area, wherein emphasizing the video feed of the participant associated with the topic relevance score greater than the threshold comprises adding textual information identifying the participant to the video conference interface and placing the emphasized video feed in the second designated area, wherein the textual information explains why the video feed of the participant is being emphasized, and wherein the method further comprises updating the topic relevance score for each participant after certain words are found in the audio feeds and replacing the video feed in the second designated area with a different video feed based on the updated topic relevance scores.

2. The method as recited in claim 1, wherein identifying the plurality of participants to the video conference comprises receiving, by the participant modeling module, a participant model for each of the plurality of participants.

3. The method as recited in claim 2, wherein calculating the topic relevance score for each of the plurality of participants includes comparing, by the participant modeling module, the contextual information to the participant model to determine a relationship between the conversation and the identifying characteristics of the participant.

4. The method as recited in claim 3, wherein the topic relevance score rates a correlation between the contextual information and the identifying characteristics of the participant.

5. The method as recited in claim 2, wherein the method further comprises generating the participant model for each participant based on input data associated with each participant.

6. The method as recited in claim 5, wherein the input data includes one or more of a participant resume, employee profile, or authored work.

7. The method as recited in claim 1, further comprising continuously updating the topic relevance score for each participant as additional contextual information is identified throughout the conversation captured in the audio feed.

8. The method as recited in claim 1, wherein identifying the topic relevance score which is greater than a threshold value includes comparing the topic relevance scores of different participants to identify outliers.

9. The method as recited in claim 1, wherein emphasizing the participant associated with the topic relevance score greater than the threshold further comprises adjusting a presentation of a video feed associated with that participant within the video conference interface.

10. The method as recited in claim 9, wherein adjusting the presentation of the video feed comprises highlighting the video feed.

11. The method as recited in claim 9, wherein adjusting the presentation of the video feed comprises placing the video feed in a designated portion of the video conference interface.

12. The method as recited in claim 1, wherein the textual information comprises one or more of the participant's title or area of expertise.

13. A video conferencing system, comprising:
a processing device configured to manage a video conference by executing software stored on a memory device to:
receive a plurality of video feeds and audio feeds associated with a plurality of participants engaged in a conversation via the video conference;

generate a video conference feed based on the plurality of video feeds and audio feeds, the video conference feed including a video conference interface for being displayed to the plurality of participants, the video conference interface comprising a first designated area, a second designated area, and a third designated area, wherein the first designated area is larger than the second designated area, and the second designated area is larger than the third designated area;

select a video feed associated with a current speaker based on audio feed activity and place the selected video feed in the first designated area;

analyze the audio feeds to identify contextual information associated with the conversation;

calculate a topic relevance score for each of the plurality of participants based on the contextual information;

emphasize a video feed of a participant associated with a topic relevance score greater than a threshold within the video conference interface; and place additional video feeds from the plurality of video feeds in the third designated area, wherein emphasizing the video feed of the participant comprises adding textual information identifying the participant to the video conference interface and placing the emphasized video feed in the second designated area, wherein the textual information explains why the video feed of the participant is being emphasized, and wherein managing the video conference further comprises updating the topic relevance score for each participant after certain words are found in the audio feeds and replacing the video feed in the second designated area with a different video feed based on the updated topic relevance scores.

14. The video conferencing system of claim 13, wherein analyzing the audio feed conversation includes performing a speech recognition process to identify the contextual information.

15. The video conferencing system of claim 14, wherein the processing device is further configured to select the one or more video feeds to emphasize by providing speech recognition data into a plurality of participant models to determine topic relevance scores.

16. The video conferencing system of claim 15, wherein selecting the one or more video feeds to emphasize includes comparing the topic relevance scores to a threshold value and identifying a video feed associated with a topic relevance score based on the comparison.

17. The video conferencing system of claim 13, wherein emphasizing the video feed further comprises adjusting a presentation of the video feed within the interface which is displayed on the plurality of participant devices.

18. The video conferencing system of claim 13, wherein emphasizing the video feed further comprises highlighting the video feed within the interface which is displayed on the plurality of participant devices.

* * * * *